United States Patent
Sekii

(10) Patent No.: US 10,318,774 B2
(45) Date of Patent: Jun. 11, 2019

(54) HOUSING, HOUSING UNIT, AND CASING UNIT

(71) Applicant: Nidec Corporation, Kyoto (JP)

(72) Inventor: Yoichi Sekii, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 15/728,589

(22) Filed: Oct. 10, 2017

(65) Prior Publication Data

US 2018/0285610 A1     Oct. 4, 2018

(30) Foreign Application Priority Data

Mar. 30, 2017 (JP) ................................ 2017-068290

(51) Int. Cl.

| F21V 13/04 | (2006.01) |
| G06K 7/10 | (2006.01) |
| F21V 7/10 | (2006.01) |
| G02B 7/182 | (2006.01) |
| G02B 26/10 | (2006.01) |
| G06K 7/14 | (2006.01) |

(52) U.S. Cl.
CPC ............ G06K 7/10544 (2013.01); F21V 7/10 (2013.01); F21V 13/04 (2013.01); G02B 7/1821 (2013.01); G02B 26/10 (2013.01); G06K 7/14 (2013.01); *G06K 2007/10485* (2013.01); *Y02E 60/16* (2013.01)

(58) Field of Classification Search
CPC .................. G06K 7/10544; G06K 7/14; G06K 2007/10485; F21V 7/10; F21V 13/04; Y02E 60/16

USPC .......................................................... 235/454
See application file for complete search history.

(56) References Cited

U.S. PATENT DOCUMENTS

| 4,257,419 A | * | 3/1981 | Goltner | ................. | A61B 17/00 606/140 |
| 4,293,864 A | * | 10/1981 | Scott | ...................... | B41B 19/00 347/257 |
| 4,512,626 A | * | 4/1985 | Kamiya | ................... | B41J 2/471 359/200.1 |
| 5,214,528 A | * | 5/1993 | Akanabe | ............... | G02B 26/10 358/493 |
| 5,367,399 A | * | 11/1994 | Kramer | ............... | G02B 26/106 250/236 |
| 5,481,384 A | * | 1/1996 | Kramer | ............... | G02B 26/106 359/17 |
| 5,610,751 A | * | 3/1997 | Sweeney | ............... | G02B 26/10 359/197.1 |

(Continued)

*Primary Examiner* — Claude J Brown
(74) *Attorney, Agent, or Firm* — Keating & Bennett, LLP

(57) ABSTRACT

A housing includes a first tubular portion being tubular, arranged to extend along a central axis extending in a vertical direction, and having a first cavity defined radially inside of the first tubular portion; and a second tubular portion being tubular, connected to a lower portion of the first tubular portion directly or indirectly, and having a second cavity defined radially inside of the second tubular portion. The first cavity is arranged to define a light path along which the incoming light travels, and is connected to the second cavity. The second tubular portion is arranged to house at least a portion of the optical component therein. The first and second tubular portions are defined by a single monolithic member.

13 Claims, 4 Drawing Sheets

(56) References Cited

U.S. PATENT DOCUMENTS

| | | | | |
|---|---|---|---|---|
| 5,768,001 A * | 6/1998 | Kelley | ............... | G02B 26/10 359/17 |
| 6,130,769 A * | 10/2000 | Tempest | ............... | G02B 7/1821 359/209.1 |
| 6,291,831 B1 * | 9/2001 | Koren | ............... | G02B 26/10 250/584 |
| 6,624,438 B2 * | 9/2003 | Koren | ............... | G01T 1/2964 250/584 |
| 6,717,756 B2 * | 4/2004 | Berman | ............... | G02B 26/10 347/233 |
| 7,202,985 B2 * | 4/2007 | Miyagawa | ............... | G02B 26/123 347/224 |
| 2003/0067681 A1 * | 4/2003 | Mazzone | ............... | G06K 7/10881 359/454 |
| 2006/0268549 A1 * | 11/2006 | Oehlke | ............... | F21S 10/06 362/276 |
| 2007/0125864 A1 | 6/2007 | Hayakawa | | |
| 2007/0181439 A1 * | 8/2007 | Wu | ............... | C25B 9/08 205/620 |
| 2008/0278715 A1 * | 11/2008 | Swenson | ............... | G01S 7/4812 356/141.5 |
| 2015/0374507 A1 * | 12/2015 | Wolters | ............... | A61F 2/447 623/17.15 |
| 2016/0299170 A1 * | 10/2016 | Ito | ............... | G02B 26/10 |

\* cited by examiner

HOUSING, HOUSING UNIT, AND CASING UNIT

CROSS REFERENCE TO RELATED APPLICATIONS

This application claims the benefit of priority to Japanese Patent Application No. 2017-068290 filed on Mar. 30, 2017. The entire contents of this application are hereby incorporated herein by reference.

BACKGROUND OF THE INVENTION

1. Field of the Invention

The present invention relates to a housing, a housing unit, and a casing unit.

2. Description of the Related Art

A known scanner apparatus used for position recognition in a head-mounted display (HMD) or the like typically has installed therein an optical component arranged to reflect incoming light coming from a light source, or allow the incoming light to pass therethrough. Such a known optical apparatus in which an optical component is installed is described in, for example, JP-T 2009-518667.

The apparatus described in JP-T 2009-518667 includes a housing, a top module, and a bottom module. The housing is provided with a light source, and includes a side wall defining a light path for light emitted from the light source. The top module is arranged above the housing, and has light-receiving and processing devices installed therein. The bottom module is arranged below the housing, and has a rotating mirror to guide the light path installed therein. The housing, the top module, and the bottom module are separate members, and these members are assembled together using a plurality of fastening devices. Thus, a different mold is required for each of the members, which may lead to an increased cost. In addition, the assembling process is complicated, which may lead to a reduction in manufacturing efficiency.

SUMMARY OF THE INVENTION

A housing according to a preferred embodiment of the present invention is arranged to house therein at least a portion of a rotary drive apparatus arranged to rotate an optical component arranged to reflect incoming light coming from a light source. The housing includes a first tubular portion being tubular, arranged to extend along a central axis extending in a vertical direction, and having a first cavity defined radially inside of the first tubular portion; and a second tubular portion being tubular, connected to a lower portion of the first tubular portion directly or indirectly, and having a second cavity defined radially inside of the second tubular portion. The first cavity is arranged to define a light path along which the incoming light travels, and is connected to the second cavity. The second tubular portion is arranged to house at least a portion of the optical component therein. The first and second tubular portions are defined by a single monolithic member.

According to one preferred embodiment of the present invention, the housing including the first tubular portion, which has, inside thereof, the light path along which the incoming light coming from the light source travels, and the second tubular portion, which is arranged to house at least a portion of the optical component arranged to reflect the incoming light therein, is defined by a single monolithic member. This leads to a reduced cost and improved productivity.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a direction parallel to a central axis of a motor (a first motor), which will be described below, is referred to by the term "axial direction", "axial", or "axially", that directions perpendicular to the central axis of the motor (the first motor) are each referred to by the term "radial direction", "radial", or "radially", and that a direction along a circular arc centered on the central axis of the motor (the first motor) is referred to by the term "circumferential direction", "circumferential", or "circumferentially". It is also assumed herein that an axial direction is a vertical direction, and that a side on which a light source (a first light source) is arranged with respect to the motor (the first motor) is defined as an upper side. The shape of each member or portion and relative positions of different members or portions will be described based on the above assumptions. It should be noted, however, that the above definitions of the vertical direction and the upper and lower sides are not meant to restrict in any way the orientation of a housing, a housing unit, or a casing unit according to any preferred embodiment of the present invention when in use. Also note that the term "parallel" as used herein includes both "parallel" and "substantially parallel". Also note that the term "perpendicular" as used herein includes both "perpendicular" and "substantially perpendicular".

1. First Preferred Embodiment

1-1. Structure of Housing Unit

Figure 1:
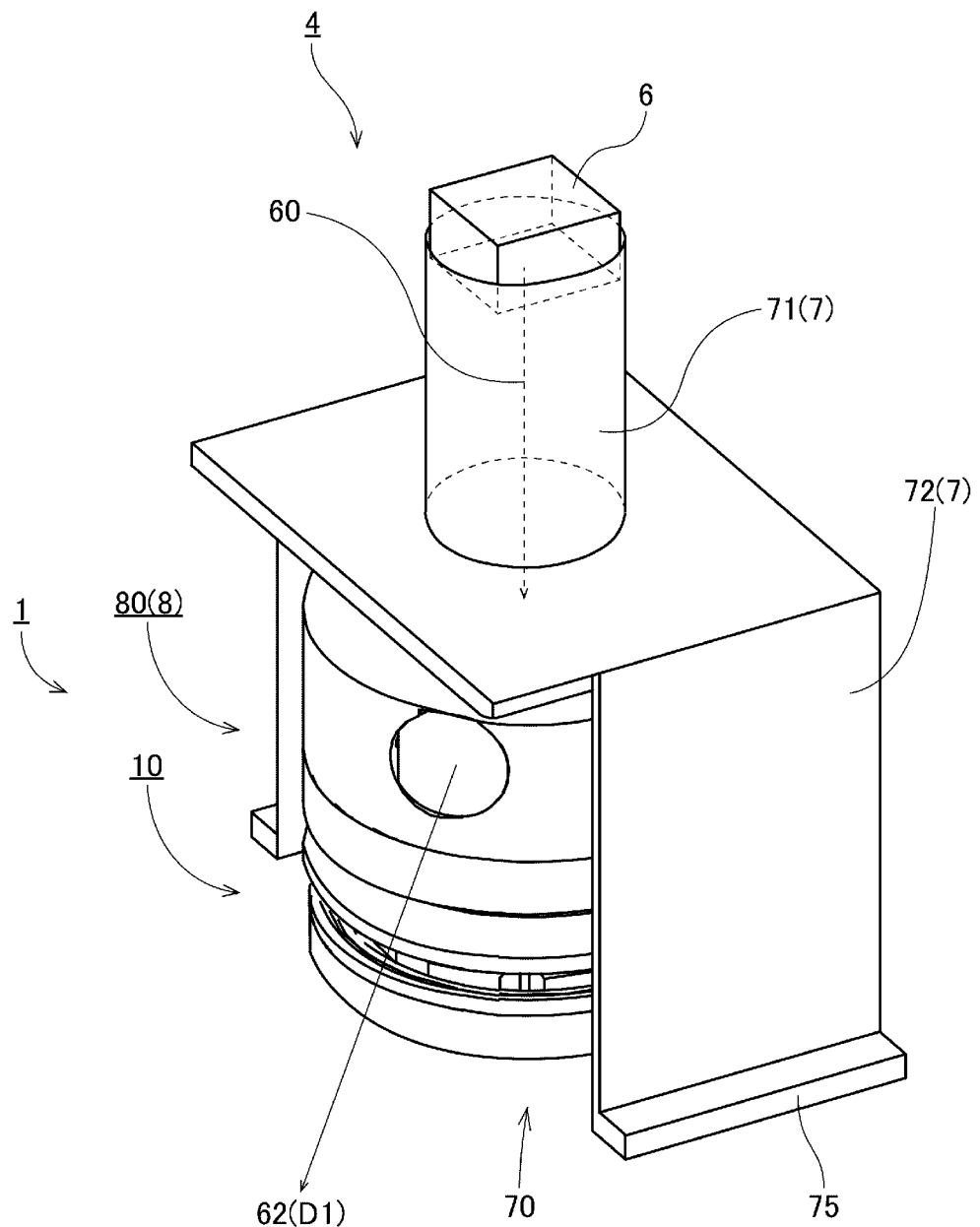
FIG. 1 is a perspective view of a housing unit according to a first preferred embodiment of the present invention.

FIG. 1 is a perspective view of a housing unit 4 according to a first preferred embodiment of the present invention. Referring to FIG. 1, the housing unit 4 includes a rotary drive apparatus 1 and a housing 7. At least a portion of the rotary drive apparatus 1 is housed in the housing 7.

1-2. Structure of Rotary Drive Apparatus

The rotary drive apparatus 1 is an apparatus arranged to rotate an optical component arranged to cause incoming light 60 coming from a light source 6 to be reflected in a radial direction (i.e., a first radial direction D1), and emit resulting reflected light 62 to an outside of the rotary drive apparatus 1 while rotating the optical component. The light source 6 is arranged above the rotary drive apparatus 1. At least a portion of the light source 6 is arranged on a central axis 9 of a motor 10, which will be described below. The incoming light 60, which travels downward along the central axis 9, is emitted from the light source 6. In the present preferred embodiment, at least a portion of the light source 6 is arranged inside of the housing 7, and is fixed to the housing 7 through, for example, adhesion. Note, however, that the light source 6 may alternatively be arranged outside of the housing 7 or outside of a casing 53, which will be described below.

The rotary drive apparatus 1 includes the motor 10 and a flywheel 8.

1-3. Structure of Motor

Figure 2:
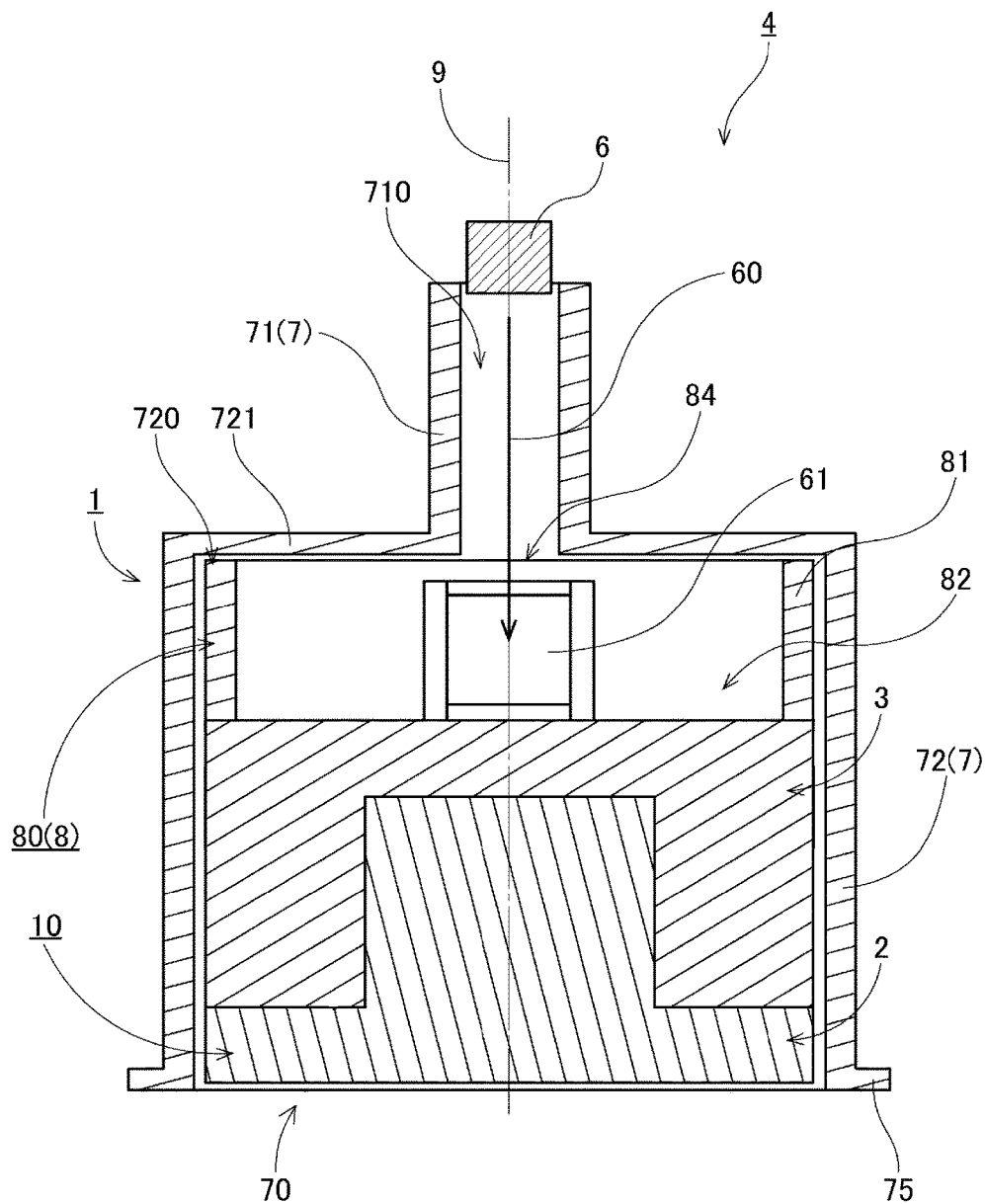
FIG. 2 is a vertical sectional view of the housing unit according to the first preferred embodiment.
Figure 3:
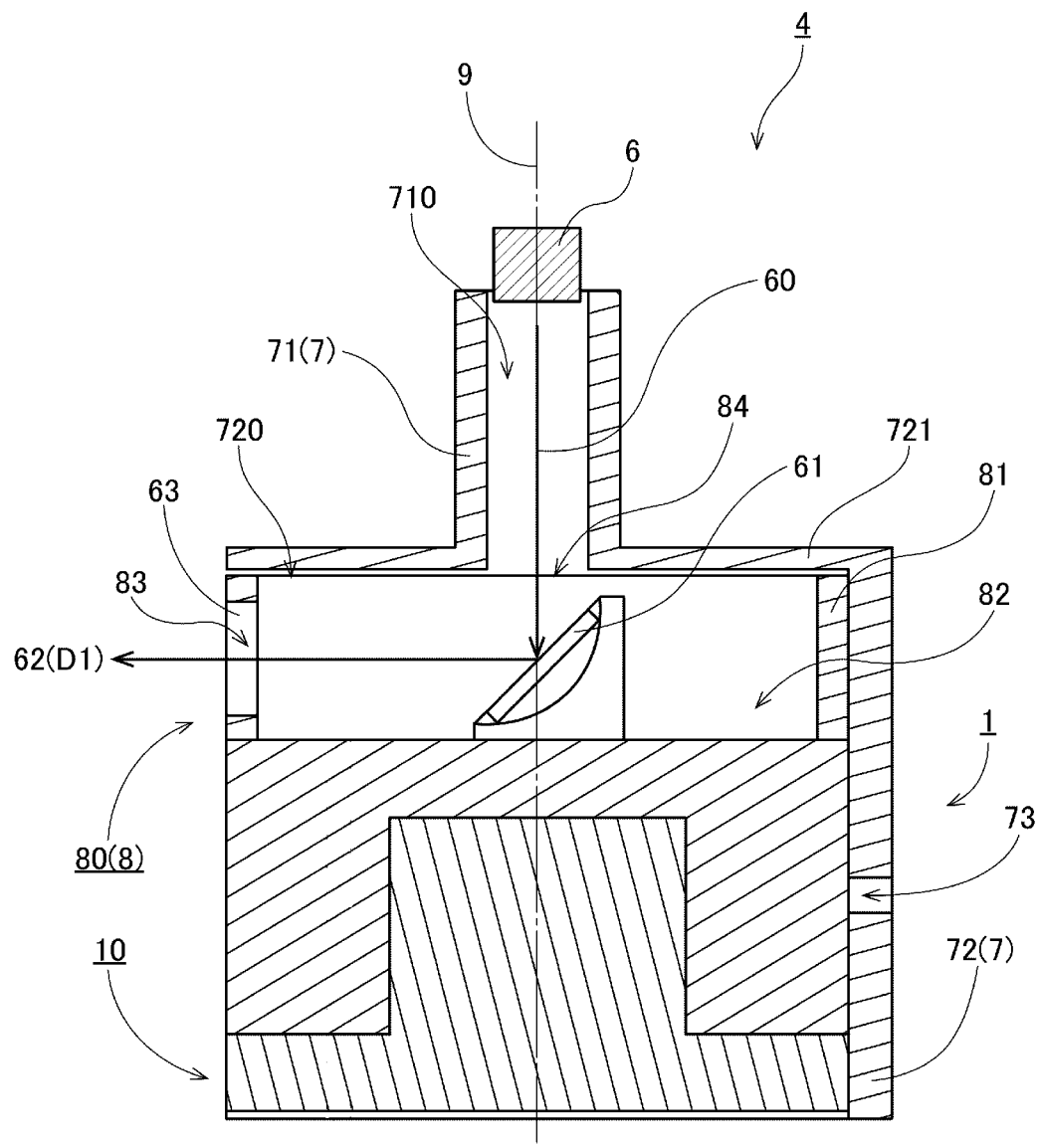
FIG. 3 is a vertical sectional view of the housing unit according to the first preferred embodiment.

First, the structure of the motor 10 will now be described below. FIG. 2 is a vertical sectional view of the housing unit 4 according to the first preferred embodiment. FIG. 3 is a vertical sectional view of the housing unit 4 according to the first preferred embodiment taken along a plane different from that of FIG. 2.

The motor 10 includes a stationary portion 2 including a stator, and a rotating portion 3 including a magnet. The stationary portion 2 is arranged to be stationary relative to the housing 7, in which the rotary drive apparatus 1 is housed. In addition, the stationary portion 2 is fixed to at least a portion of an inner surface of the housing 7 through, for example, fitting, screwing, or adhesion. The rotating portion 3 is supported through a bearing portion (not shown) to be rotatable about the central axis 9, which extends in the vertical direction, with respect to the stationary portion 2.

Once electric drive currents are supplied to coils included in the stationary portion 2, magnetic flux is generated around each of a plurality of teeth, which are magnetic cores for the coils. Then, interaction between the magnetic flux of the teeth and magnetic flux of the magnet included in the rotating portion 3 produces a circumferential torque between the stationary portion 2 and the rotating portion 3, so that the rotating portion 3 is caused to rotate about the central axis 9 with respect to the stationary portion 2. Thus, the flywheel 8, which is rotatably held by the rotating portion 3, is caused to rotate about the central axis 9 together with the rotating portion 3.

As the bearing portion (not shown), a fluid dynamic bearing, in which a portion of the stationary portion 2 and a portion of the rotating portion 3 are arranged opposite to each other with a gap in which a lubricating oil exists therebetween and which is arranged to induce a fluid dynamic pressure in the lubricating oil, is used, for example. Note that a bearing of another type, such as, for example, a rolling-element bearing, may alternatively be used as the bearing portion (not shown).

1-4. Structure of Flywheel

Next, the structure of the flywheel 8 will now be described below.

Referring to FIGS. 2 and 3, the flywheel 8 is arranged below the light source 6, and is supported by an upper end portion of the rotating portion 3 of the motor 10. The flywheel 8 is fixed to an upper surface of the rotating portion 3 through, for example, engagement, an adhesive, or the like. The flywheel 8 includes optical components, including a mirror 61 and a lens 63, and a main body 80. The main body 80 is arranged to support each of the mirror 61 and the lens 63. A resin, for example, is used as a material of the main body 80. Glass, for example, is used as materials of the mirror 61 and the lens 63. The glass is not limited to particular types of glass. For example, organic glass, inorganic glass, or the like, containing a resin, a metal, or other materials, may be used as the materials of the mirror 61 and the lens 63.

The mirror 61 is in the shape of a plate. The mirror 61 is fixed to a resin member of the main body 80, and at least a portion of the mirror 61 is arranged on the central axis 9. In addition, the mirror 61 is inclined at an angle of 45 degrees with respect to the axial direction and the first radial direction D1. The incoming light 60 impinges on a central portion of the mirror 61. The central portion of the mirror 61 refers to the entire mirror 61, excluding a peripheral portion of the mirror 61. A fully reflective mirror, for example, is used as the mirror 61.

The lens 63 is in the shape of a disk. The lens 63 is fixed in a through hole 83 of the main body 80, which will be described below, through, for example, adhesion or engagement directly or through a lens frame (not shown) arranged to be in contact with at least a portion of a peripheral portion of the lens 63. In addition, the lens 63 is arranged at right angles to the first radial direction D1, that is, in parallel with the central axis 9, in a state in which the lens 63 is fixed to the main body 80. A resin, for example, is used as a material of the lens 63. The incoming light 60 is reflected by the mirror 61 inside of the flywheel 8 to become the reflected light 62. The reflected light 62 passes through a central portion of the lens 63 to be emitted to an outside of the flywheel 8. The central portion of the lens 63 refers to the entire lens 63, excluding the peripheral portion of the lens 63.

The main body 80 includes a tubular portion 81 and a hollow portion 82. The tubular portion 81 is a cylindrical member arranged to extend along the central axis 9. The hollow portion 82 is a cavity defined inside of the main body 80. In addition, the through hole 83, which is arranged to pass through the tubular portion 81 in the first radial direction D1, is defined in the tubular portion 81 at one circumferential position. The lens 63 or the lens frame (not shown), which is arranged to be in contact with the peripheral portion of the lens 63, is fitted and fixed in the through hole 83. The hollow portion 82, the mirror 61, and the lens 63 are arranged to overlap at least in part with one another when viewed in the first radial direction D1. Further, a through hole 84 is defined in an upper surface of the main body 80. The through hole 84 is arranged to pass through a portion or a whole of the upper surface of the main body 80 in the axial direction, the through hole 84 extending on and around the central axis 9.

The incoming light 60, which is emitted from the light source 6, comes from above an upper surface of the flywheel 8, passes through the through hole 84, and travels downward along the central axis 9 in the hollow portion 82 radially inside of the tubular portion 81. Then, the incoming light 60 is reflected by the mirror 61 to become the reflected light 62. The reflected light 62 further travels in the first radial direction D1 in the hollow portion 82, and is emitted to the outside of the rotary drive apparatus 1 through the lens 63 fitted in the through hole 83 of the tubular portion 81.

The mirror 61 of the flywheel 8 is arranged to reflect the incoming light 60 coming from the light source 6 and emit the reflected light 62 to the outside of the rotary drive apparatus 1 while rotating about the central axis 9 together with the rotating portion 3 of the motor 10. Therefore, the first radial direction D1, which is a direction in which the reflected light 62 is emitted, also rotates together with the rotating portion 3. Thus, a wide range can be irradiated with light. Note that the rotation speed of the rotary drive apparatus 1 can be recognized by sensing rotation of the reflected light 62, which is emitted out of the flywheel 8, using a sensor (not shown) arranged on the housing 7, on the casing 53, which will be described below, or outside of the casing 53. Each of an outer circumferential surface of the main body 80 and an inner circumferential surface of the housing 7 has a reflectivity lower than that of a front surface of the mirror 61. This contributes to preventing diffuse reflection of the incoming light 60 coming from the light source 6.

Note that the rotary drive apparatus 1 may further include, in addition to the flywheel 8 arranged to emit the reflected light 62 to the outside in the first radial direction D1, another flywheel (not shown) which is arranged to emit reflected light to the outside in a second radial direction different from the first radial direction D1, and which is arranged, for example, below the motor 10. In this case, a half mirror the transmissivity and reflectivity of which are substantially equal is used as the mirror 61. Then, a half of the incoming light 60 which impinges on the mirror 61 in the flywheel 8 is reflected in the first radial direction D1 to be emitted to the outside. In addition, a remaining half of the incoming light 60 which impinges on the mirror 61 is allowed to pass through the mirror 61 and travel further downward. Further, a through hole passing through the motor 10 in the axial direction is defined around the central axis 9 in the motor 10. Thus, the portion of the incoming light which has passed through the mirror 61 passes through the through hole and reaches the other flywheel arranged below the motor 10. Then, in the other flywheel, all the remaining half of the incoming light 60 is reflected in the second radial direction, using a fully reflective mirror (not shown), to be emitted to the outside. Note that the rotary drive apparatus 1 may alternatively include, above the flywheel 8, another flywheel (not shown) which includes a half mirror and is arranged to emit reflected light in the aforementioned second radial direction. Also note that a plurality of mirrors (not shown), including a half mirror, which are arranged to reflect the incoming light 60 in mutually different directions may alternatively be installed in the single flywheel 8.

When light is emitted out in the two different directions, i.e., the first radial direction D1 and the second radial direction, as described above, light beams that are emitted out in the two different directions take different times to reach an object to be irradiated with light while the motor 10 is rotating, and this makes it possible to precisely recognize the three-dimensional position of the object in a space. Note that the other flywheel may alternatively be arranged in a rotary drive apparatus (not shown) other than the rotary drive apparatus 1 including the flywheel 8.

1-5. Structure of Housing

Next, the structure of the housing 7 will now be described below. The following description will be made with reference to FIGS. 1 to 3 appropriately.

The housing 7 is arranged to house at least a portion of the rotary drive apparatus 1 therein. A resin or a metal, for example, is used as a material of the housing 7. Use of the resin allows the housing 7 to be molded easily and at a low cost. Meanwhile, use of the metal leads to an improvement in accuracy with which the housing 7 is shaped and an improvement in dimensional accuracy of the housing 7. The housing 7 includes a first tubular portion 71 and a second tubular portion 72.

The first tubular portion 71 is a tubular portion arranged to extend along the central axis 9. The first tubular portion 71 has a first cavity 710, which is a cavity defined radially inside of the first tubular portion 71. At least a portion of the light source 6, including a lower end portion of the light source 6, is housed in the first cavity 710. The first cavity 710 defines a light path along which the incoming light 60 travels. Further, the first cavity 710 is connected to a second cavity 720, which is a cavity defined radially inside of the second tubular portion 72, which will be described below.

The second tubular portion 72 is a tubular portion arranged below the first tubular portion 71. The second tubular portion 72 is arranged to have an outside diameter greater than that of the first tubular portion 71. The second tubular portion 72 may be connected to a lower portion of the first tubular portion either directly or indirectly through another portion (not shown). In the present preferred embodiment, the second tubular portion 72 includes a tubular portion and an upper surface 721 arranged to join an upper end portion of the tubular portion and a lower end portion of the first tubular portion 71. At least a portion of the rotary drive apparatus 1 is arranged below the upper surface 721 of the second tubular portion 72 and radially inside of the tubular portion of the second tubular portion 72. In addition, the rotary drive apparatus 1 is fixed to an inner surface of the second tubular portion 72 through, for example, fitting or engagement.

The first and second tubular portions 71 and 72 are defined by a single monolithic member. This allows the housing 7 to be molded using a single mold, which enables a reduction in a production cost of the housing 7. In addition, an assembling process can be made simpler, resulting in improved productivity. Further, the housing 7 can be fitted to the casing 53, which will be described below, with improved accuracy since crossing of parts of the housing 7 can be reduced.

Further, the second tubular portion 72 has an opening portion 70 defined at at least one circumferential position. In the present preferred embodiment, about a circumferential half of a side surface of the rotary drive apparatus 1 is exposed to the opening portion 70 of the housing 7. The reflected light 62, which has been reflected by the mirror 61 inside of the flywheel 8, travels outward in the first radial direction D1, and is emitted to the outside of the rotary drive apparatus 1 through the lens 63 and the opening portion 70. Note that provision of the opening portion 70 results in a reduction in the amount of the resin required to mold the housing 7, and a reduction in the production cost of the housing 7.

In addition, the second tubular portion 72 includes a second through hole 73 arranged to pass through the second tubular portion 72 in a radial direction at a position different from that of the opening portion 70. At least a portion of the rotating portion 3 of the motor 10 is exposed to an outside of the housing 7 through the second through hole 73. If infrared rays, light beams, or the like are emitted toward the second through hole 73 from the outside of the housing 7, for example, when the rotating portion 3 is rotating while the rotary drive apparatus 1 is running, the infrared rays, the light beams, or the like are reflected by an exposed portion of the rotating portion 3. Then, the rotation speed of the rotary drive apparatus 1 can be recognized by sensing the reflected light beams with an infrared sensor, a photoelectric sensor, or the like (not shown) arranged outside of the housing 7. The second through hole 73 is defined, for example, in a surface of the housing 7 which is opposite to a surface of the housing 7 including the opening portion 70. Note, however, that the second through hole 73 may alternatively be defined at any other desirable position.

Further, the housing 7 includes one or more collar portions 75 each of which is arranged to project radially outward from an upper end or a lower end of the first tubular portion 71 or the second tubular portion 72. In the present preferred embodiment, each collar portion 75 is arranged to project radially outward from the lower end of the second tubular portion 72.

2. Second Preferred Embodiment

Figure 4:
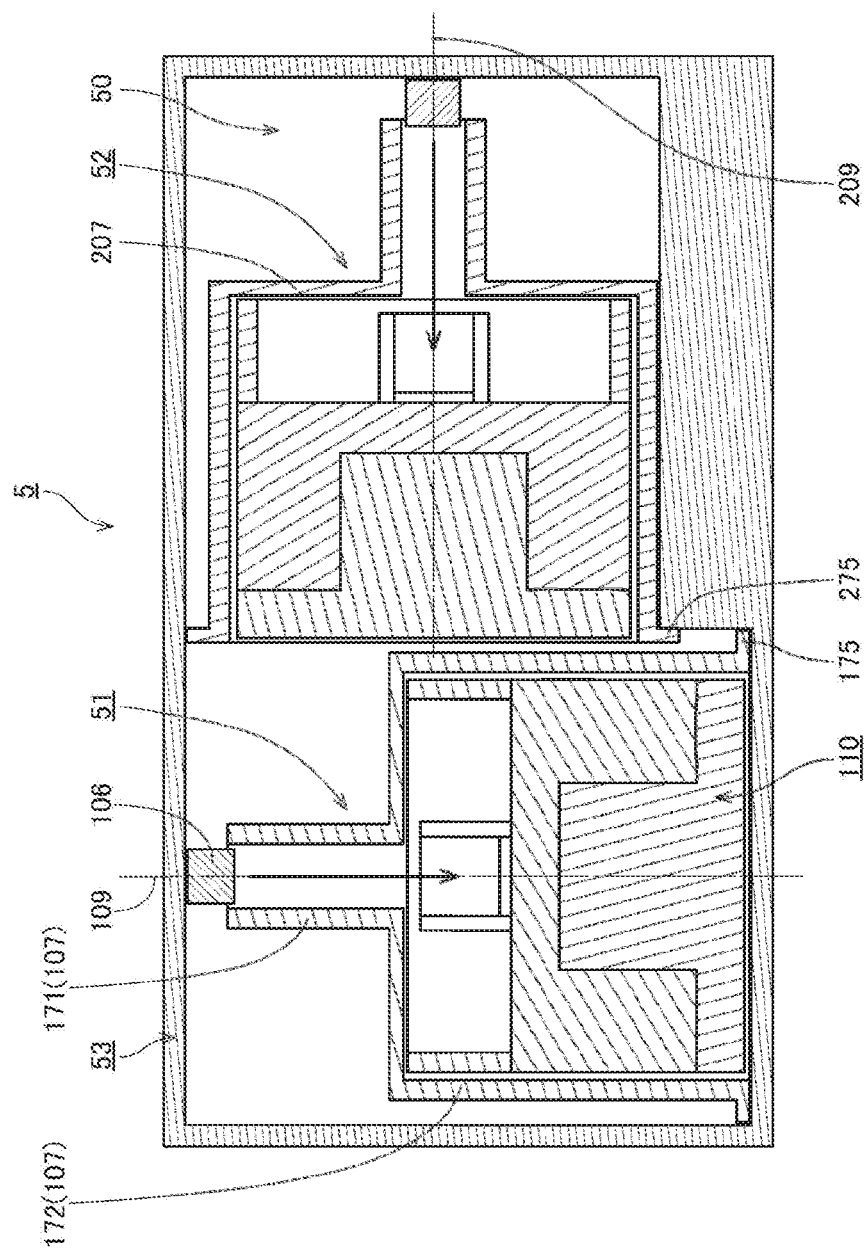
FIG. 4 is a vertical sectional view of a casing unit according to a second preferred embodiment of the present invention.

FIG. 4 is a vertical sectional view of a casing unit 5 according to a second preferred embodiment of the present invention. The casing unit 5 includes a first housing unit 51, which is the same as the housing unit 4 according to the first preferred embodiment, a second housing unit 52, which is different from the first housing unit 51, and a casing 53. The second housing unit 52 has a structure equivalent to that of the first housing unit 51. In a vertical sectional view, the casing 53 is arranged to have a rectangular external shape, and have a greater dimension in a longitudinal direction and a smaller dimension in a transverse direction. In addition, the three-dimensional external shape of the casing 53 is a rectangular parallelepiped, and the casing 53 has a third cavity 50, which is a cavity defined inside of the casing 53. The casing 53 is arranged to house at least a portion of the first housing unit 51 and at least a portion of the second housing unit 52 in the third cavity 50. The dimension of a first housing 107, which is a housing included in the first housing unit 51, as measured in a direction parallel to a first central axis 109 is smaller than the dimension of the casing 53 as measured in the transverse direction. A resin or a metal, for example, is used as a material of the casing 53. A motor housed in the first housing 107 is referred to as a first motor 110. In addition, a light source fixed to the first housing 107 is referred to as a first light source 106.

Referring to FIG. 4, the first and second housing units 51 and 52 are housed in the third cavity 50 of the casing 53, and are arranged to overlap with each other when viewed in the longitudinal direction of the casing 53. In addition, in a state in which the first and second housing units 51 and 52 are housed in the third cavity 50 of the casing 53, the first central axis 109, which is a central axis of the first housing 107, and a second central axis 209, which is a central axis of a second housing 207, which is a housing of the second housing unit 52, are arranged to cross each other. This contributes to reducing the size of the casing 53, with the casing 53 being able to house the first and second housing units 51 and 52. This in turn contributes to reducing the amount of the resin used to mold the casing 53, resulting in a reduced cost.

A collar portion 175 of the first housing 107 is fixed to the casing 53 through press fitting, adhesion, welding, or screwing. In addition, a collar portion 275 of the second housing 207 is fixed to the casing 53 through press fitting, adhesion, welding, or screwing. This allows each of the first and second housings 107 and 207 to be easily and accurately fixed to a predetermined position in an inner surface of the casing 53. In addition, rotation of a rotary drive apparatus 1 housed in each of the first and second housings 107 and 207 can be sensed with higher accuracy using an infrared sensor, a photoelectric sensor, or the like (not shown) arranged on the inner surface of the casing 53. Note that the first housing 107 may alternatively be fixed to the casing 53 at a portion other than the collar portion 175 through press fitting, adhesion, welding, or screwing. Also note that the second housing 207 may alternatively be fixed to the casing 53 at a portion other than the collar portion 275 through press fitting, adhesion, welding, or screwing.

3. Example Modifications

While preferred embodiments of the present invention have been described above, it will be understood that the present invention is not limited to the above-described preferred embodiments.

In the above-described second preferred embodiment, the casing unit 5 includes the first and second housing units 51 and 52 and the casing 53. Note, however, that the casing unit 5 may alternatively include three or more housing units including the first and second housing units 51 and 52. Also note that at least a portion of each of the three or more housing units may be housed in the third cavity 50 of the casing 53.

Each of the housing units housed in the casing 53 preferably includes a housing (not shown) of an equal size. This enables the housing of each of the housing units to be molded using a single mold, which leads to a reduced production cost.

Further, the housing units (not shown) may be arranged to overlap with each other when viewed in the longitudinal direction with central axes of the housings of the housing units being arranged to cross each other, and this will contribute to reducing the size of the casing 53 with the casing 53 being able to house the housing units therein. Thus, an increased number of rotary drive apparatuses can be easily and accurately arranged at predetermined positions in a place having a limited space.

Note that the detailed shape of any member may be different from the shape thereof as illustrated in the accompanying drawings of the present application. Also note that features of the above-described preferred embodiments and the modifications thereof may be combined appropriately as long as no conflict arises.

Preferred embodiments of the present invention are applicable to, for example, housings, housing units, and casing units.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A housing unit, comprising:
  a rotary drive apparatus arranged to rotate an optical component arranged to reflect incoming light coming from a light source; and
  a housing arranged to house therein at least a portion of the rotary drive apparatus, the housing including:
    a first tubular portion being tubular, arranged to extend along a central axis extending in a vertical direction, and having a first cavity defined radially inside of the first tubular portion; and
    a second tubular portion being tubular, connected to a lower portion of the first tubular portion directly or indirectly, and having a second cavity defined radially inside of the second tubular portion; wherein
  the first cavity is arranged to define a light path along which the incoming light travels, and is connected to the second cavity;
  the second tubular portion is arranged to house at least a portion of the optical component therein;
  the first and second tubular portions are defined by a single monolithic member;
  the rotary drive apparatus includes:

a motor including a rotating portion arranged to rotate about the central axis; and a flywheel including the optical component, supported by the rotating portion, and caused by the rotating portion to rotate about the central axis;

the second tubular portion has an opening portion defined in at least one circumferential position; and the opening portion is arranged to allow reflected light resulting from reflection of the incoming light by the optical component to be emitted to an outside of the rotary drive apparatus therethrough; and a second through hole extends through the second tubular portion in a radial direction at a position different from that of the opening portion; and a rotation speed of the rotary drive apparatus is detected by sensing reflected light beams which exit out from the housing unit through the second through hole.

2. The housing unit according to claim 1, wherein the housing is made of a resin.

3. The housing unit according to claim 1, wherein the housing is made of a metal.

4. The housing unit according to claim 1, wherein the second tubular portion is arranged to have an outside diameter greater than that of the first tubular portion.

5. The housing unit according to claim 1, wherein the second tubular portion further includes a second through hole arranged to pass through the second tubular portion in a radial direction at a position different from that of the opening portion.

6. The housing unit according to claim 1, wherein at least a portion of the light source is arranged on the central axis; and the first tubular portion is further arranged to house at least a portion of the light source in the first cavity.

7. A casing unit comprising a casing and a plurality of housing units including a first housing unit and a second housing unit different from the first housing unit, the first housing unit being the housing unit of claim 1, wherein the casing is arranged to house at least a portion of each of the plurality of housing units therein.

8. The casing unit according to claim 7, wherein the first housing unit includes one or more collar portions each of which is arranged to project radially outward from an upper end or a lower end of the first tubular portion or the second tubular portion, and is fixed to the casing through press fitting, adhesion, welding, or screwing.

9. The casing unit according to claim 7, wherein each of the plurality of housing units includes a housing of an equal size.

10. The casing unit according to claim 7, wherein the second housing unit includes a second housing having a second central axis as a central axis thereof; and the central axis of the housing of the first housing unit is arranged to cross the second central axis.

11. The casing unit according to claim 7, wherein each of the plurality of housing units includes a housing; and central axes of the housings of the plurality of housing units are arranged to cross each other.

12. The casing unit according to claim 7, wherein in a vertical sectional view, the casing is rectangular and has a greater dimension in a longitudinal direction; and the first and second housing units are arranged to overlap with each other when viewed in the longitudinal direction of the casing.

13. The casing unit according to claim 7, wherein in a vertical sectional view, the casing is rectangular and has a smaller dimension in a transverse direction; and the housing of the first housing unit is arranged to have an axial dimension smaller than a dimension of the casing as measured in the transverse direction.

* * * * *